No. 783,583.

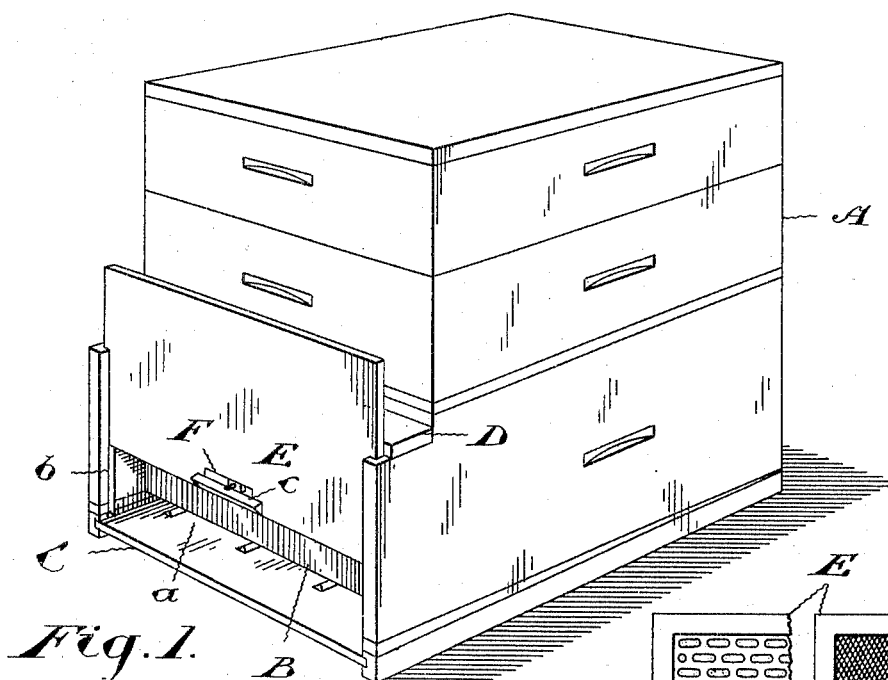
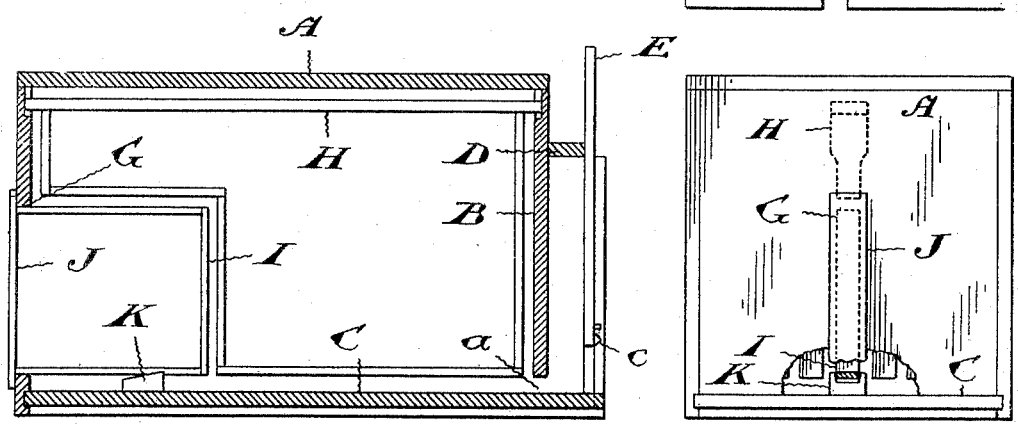

Patented February 28, 1905.

UNITED STATES PATENT OFFICE.

RICHARD F. HOLTERMANN, OF BRANTFORD, CANADA.

BEEHIVE.

SPECIFICATION forming part of Letters Patent No. 783,583, dated February 28, 1905.

Application filed April 11, 1904. Serial No. 202,587.

*To all whom it may concern:*

Be it known that I, RICHARD F. HOLTERMANN, of the city of Brantford, in the county of Brant, Province of Ontario, Canada, have invented certain new and useful Improvements in Beehives, of which the following is a specification.

The object of my invention is to devise a beehive which will possess special advantages both in summer and winter and at swarming seasons and in which the time at which the formation of brood-cells is commenced is easily ascertained without opening up the hive; and it consists, essentially, of a hive provided with a porch or extension at its front capable of being partly or completely closed and also provided with means whereby a comb-frame may be withdrawn from the back of the hive without disturbing the other comb-frames, the whole being constructed in detail substantially as hereinafter more specifically described and then definitely claimed.

Figure 1 is a perspective front view of the beehive provided with my improvements. Fig. 2 shows in elevation two forms of slide used in closing the front of the hive. Fig. 3 is a longitudinal sectional elevation of a one-story hive provided with my improvements. Fig. 4 is a rear elevation of the same.

In the drawings like letters of reference indicate corresponding parts in the different figures.

A represents the body of the hive of ordinary construction, and B the front wall, between which and the bottom C is an aperture for the entrance and exit of the bees.

By extending the side walls and bottom of the hive and applying a covering-board D thereto I form a covered porch in front of the hive.

It will be noted that the covering-board is of less width than the extensions of the sides and that vertical grooves *b* are formed in the sides in line with the outer edge of the covering-board. In these grooves may be fitted the front E. In Fig. 1 I show this front as a solid board having an aperture F for the entrance and exit of the bees formed at its lower side. Below the aperture is placed a lighting-board *c*. The aperture may be either plain or adjustable in any well-known manner.

When the solid front is closed, it acts as an efficient protection to the front of the hive from the sun and provides the front of the hive with an effective breathing-space for the bees. In winter the space between the ordinary front of the hive and the slide may be suitably packed, leaving merely a passage-way for the bees.

Instead of the solid front a slide fitted with perforated metal, such as shown at the right hand in Fig. 2, may be employed when it is desired to permit the workers to pass in and out, but to restrain the queen and drones.

If it is desired to completely close the hive and at the same time to provide ventilation, a slide filled with wire-netting, such as shown at the right hand in Fig. 2, may be employed.

It is important in bee-keeping to ascertain when the bees are commencing the formation of brood-cells. Ordinarily this can only be done by opening up the hive and removing a frame from above. I obviate this difficulty by cutting a vertical slot G in the back of the hive exactly in line with one of the ordinary frames H. A small frame I is shaped so that it may be inserted through this slot, and the rear end of the frame H is jogged, as shown, to accommodate itself to this frame. Of course this construction is not essential, as the small frame might be a great deal larger and take up all or nearly all the space allotted to the frame H, the essential feature being the providing of a frame removable through a slot or opening at the back of the hive.

The end J of the frame is made larger than the aperture, so that it overlaps the same and affords an effective closure.

To guide the small frame and hold it up in position, I prefer to provide a small grooved wedge-shaped block K, which receives the end of the frame as the latter is pushed in and guides it up into position. As this small frame extends well in toward the center of the hive, when the bees commence the formation of brood-cells some will certainly be formed in this frame, and the fact can be ascertained at any time by withdrawing and examining it.

It should be mentioned that the small frame contains comb, upon which by means of a broken surface or otherwise or owing to suitable space being left the bees will commence the formation of queen-cells. The small frame may also be used to contain a feeder made of a suitable size to take the place of a comb. The object of this is to bring feed within the reach of the bees during the cold weather to prevent starvation or to stimulate brood-rearing at the proper season.

From the above description it will be seen that I have devised a hive which possesses many important advantages in the handling and care of bees.

What I claim as my invention is—

1. A beehive provided with a series of vertically-removable comb-frames and a horizontally-removable comb-frame located in the middle of the vertically-removable comb-frames, the hive having an aperture in one side through which the said frame may be removed.

2. A beehive provided with a vertical slot in its back in combination with a comb-frame adapted to pass through the said slot; and an end piece on said frame adapted to close the said slot when the frame is inserted, substantially as described.

3. A beehive having a vertical slot in its back and provided with a vertically-removable frame having a rectangular jog at its rear end in combination with a comb-frame fitting within the said jog and removable through the slot in the back of the hive, substantially as described.

4. A beehive having a vertical slot in its back and provided with a vertically-removable comb-frame having a rectangular jog at its rear end in combination with a comb-frame fitting within the said jog and removable through the slot in the back of the hive; and an end piece on said frame adapted to close the said slot when the frame is inserted, substantially as described.

Brantford, Ontario, April 5, 1904.

RICHARD F. HOLTERMANN.

In presence of—
   IRENE BAXTER,
   S. R. STEWART.